United States Patent [19]

Hadley et al.

[11] Patent Number: 4,924,420
[45] Date of Patent: May 8, 1990

[54] TACHO SIGNAL PROCESSING

[75] Inventors: Maxwell R. Hadley, Lindhurst; Richard P. Dudley, Southampton, both of United Kingdom

[73] Assignee: Stewart Hughes Limited, Southampton, United Kingdom

[21] Appl. No.: 19,674

[22] Filed: Feb. 27, 1987

[30] Foreign Application Priority Data

Mar. 3, 1986 [GB] United Kingdom ............... 8605152

[51] Int. Cl.$^5$ ................................................ G01P 3/42
[52] U.S. Cl. .................................. 364/569; 324/160; 364/508
[58] Field of Search ............... 364/569, 566, 565, 508; 73/506, 517 AV, 517 R, 491, 660; 324/178, 176, 160, 166, 172

[56] References Cited

U.S. PATENT DOCUMENTS

| | | | |
|---|---|---|---|
| 3,944,799 | 3/1976 | Brownell | 364/565 |
| 4,167,699 | 9/1979 | Baker | 324/171 |
| 4,257,005 | 3/1981 | Hall | 324/166 |
| 4,348,743 | 9/1982 | Dozier | 364/900 |
| 4,350,952 | 9/1982 | Holt et al. | 324/166 |
| 4,488,240 | 12/1984 | Kapadia et al. | 364/508 |
| 4,532,600 | 7/1985 | Mihara et al. | 364/565 |
| 4,608,650 | 8/1986 | Kapadia | 364/508 |

Primary Examiner—Parshotam S. Lall
Assistant Examiner—S. A. Melnick
Attorney, Agent, or Firm—Oliff & Berridge

[57] ABSTRACT

This invention relates to apparatus for producing a periodic output signal having a predetermined period ratio (a/b) relative to a periodic input signal.

Signals from a tachometer on a gearbox are received by a counter timer unit, the counter timer unit evaluates the number of clock pulses $k^o$ received from a clock within each period of the tacho signal. A control unit receives values of $k^o$ from the counter timer and employs an algorithm based on the following equation to calculate a count value $n^o$ to be loaded into a register for the next tacho period.

$$n^o = \frac{2^{32}a}{bk^o} + \frac{dK n^{-1}}{k^o}$$

where $dK$ represents $k^{-1} - k^o$.

An accumulator is connected via an adder to the register and at receipt of each clock pulse from the clock adds the count stored in register into the accumulator. An output is produced on line when the accumulator overflows.

20 Claims, 6 Drawing Sheets

TACHO SIGNAL PROCESSING

FIELD OF THE INVENTION

This invention relates generally to an apparatus for producing a periodic output signal having a predetermined frequency and phase relationship to a periodic input signal, and more particularly relates to a tacho signal processing apparatus for producing a plurality of output signals each having a predetermined frequency and phase relationship to a single tachometer input signal. The invention has particular application to condition monitoring of gearboxes and other complex rotating machinery.

BACKGROUND OF THE INVENTION

In order to monitor the behaviour of gearboxes and similar geared mechanical rotating machinery, and in particular to be able to detect damage therein, it has been proposed that signals representative of vibration produced from the gearbox be examined to provide information relating to the gearbox components. Typically, gearboxes have a number of rotating components, each rotating with a different period defined according to the gear ratios. The vibrations to be analysed are likely to arise from all components and, hence, it is not possible to identify a particular component of a vibration signal with a particular rotating component unless a signal representative of the rotational period of that component can be provided. Furthermore, in order to be able to identify features of the vibration signal with corresponding components in the gearbox, it is necessary to angularly correlate the identified feature of the vibration signal with the particular rotational period of the responsible rotating component. For example, a gear having a missing or damaged tooth may repetitively produce an identifiable vibration feature at a specific position of the gear component as it turns, and in order to identify this vibration feature with the responsible gear component it is necessary to have available a signal representative of the period and phase of rotation of the respective component.

The fitting of a tachometer to a rotating shaft is a well known way to produce an electrical pulse every time a predetermined point on the shaft passes a datum position and allows the occurrence of a vibration signal to be related to the angular position of the responsible vibration-inducing feature of the shaft. However, since gearboxes are commonly enclosed and commonly include many shafts rotating at different speeds it is not possible to fit a tachometer to each shaft in the gearbox. Accordingly, it is normal practice to fit a single tachometer to one shaft in the gearbox and to derive tacho signals for the remainder of the shafts from the single detected tacho signal in accordance with the known relationships between the various intermeshing gears within the gearbox.

Hitherto, it has been usual to use a circuit having a phase locked loop frequency multiplier to achieve the desired frequency and phase relationships between the single detected tacho signal and the signals derived therefrom. However, such prior art circuits suffer from the disadvantage of limited operating frequency range, and inadequate response to changes in rotational frequencies. If the shaft speeds change too rapidly, loss of lock is likely to occur resulting in inability to identify a vibrationinducing feature as a function of shaft angle. There is a need, therefore, for an apparatus which can be attached to a single gearbox shaft but allows the derivation of accurate tacho signals with fixed frequencies and phase relationship for other rotating components within the gearbox. This apparatus should be capable of responding to relatively rapid changes in shaft speed over a wide range of speeds. Additionally, it is preferable for such an apparatus to conveniently add onto vibration analysis equipment, or be incorporated within it.

SUMMARY OF THE INVENTION

According to one aspect of the present invention there is provided an apparatus for producing a periodic output signal having a predetermined period ratio and a known phase relationship relative to a received periodic input signal, the apparatus including: input means employing a clock signal having a predetermined time period to evaluate the successive periods of the received periodic input signal as multiples of the clock period and to provide successive evaluation signals representative thereof; control means for receiving as a first input thereto a definition of said predetermined period ratio and for receiving as a second input thereto said evaluation signals, said control means being adapted for calculating on the basis of said first and second inputs and in accordance with a predetermined algorithm a corresponding data signal; and output signal generation means for receiving said data signals as a first input thereto and for receiving clock signals as a second input thereto and for producing said periodic output signal with successive periods thereof being multiples of said clock period determined in accordance with said data signals.

The apparatus according to the invention can be connected to receive a periodic input signal from a tachometer attached to one shaft of a gear train and, by providing to the control means a definition of the predetermined gear ratio of a specific gear component within the gear train, an output signal representative of the period and phase of rotation of that specific component can be simply produced. The apparatus can be easily transferred to different gearboxes, since it requires connection only to a tachometer on an input or output shaft of the gearbox an definition of the gearing ratio for the shaft which it is desired to examine in order for a corresponding output signal relevant to that shaft to be produced.

For producing a plurality of said output signals, each having a respective predetermined period and phase relationship to the periodic input signal, a plurality of said output signal generation means may be provided, and said control means may be arranged to receive a plurality of said first inputs and said second input and to calculate a respective data signal for each output signal generation means. In this way, a single tacho signal input from a tachometer can be employed to produce multiple signal outputs, each output having a predetermined period ratio and known phase with respect to the input signal. Thus, a gearbox having a plurality of shafts with different gearing ratios can have a tachometer attached to a single shaft of the gearbox, and by providing to the control means a definition of the gear ratio for each shaft relative to the shaft producing the tachometer input signal, outputs for each rotating shaft in the gearbox can be produced.

The invention can also be embodied in an installation comprising a plurality of remote slave units each including a respective said input means and a respective said output means and with all the slave units being connected to a master control means adapted to calculate respective data signals for each slave unit on the basis of (i) allocated definitions of respective period ratios and (ii) the evaluation signals derived by the input means of the respective slave units from respective periodic input signals provided thereto. Such an installation enables a single control unit to provide data signals for a plurality of slave units monitoring a number of different tachometer inputs and thus enables a plurality of gearboxes to be monitored at the same time.

An apparatus according to the present invention will preferably include means for monitoring the period length of the input signal and causing the apparatus to ignore a pulse which clearly does not belong to the periodic input signal on account for example of the pulse occurring sooner than a preselected portion of said monitored period length. Consequently, if for some reason a spurious pulse occurs out of time with the periodic input signal, the spurious pulse will not produce an incorrect output signal, so that the synchronism between the true input signal and the output signal will be maintained. Such spurious pulses can frequently occur in practice in the presence of interfering electromagnetic radiation or other signals. Similarly, an apparatus according to the present invention may incorporate means for missing input pulse detection, such means operating for example by monitoring the period length of the input signal and, in response to absence of the next expected input signal, effecting a compensation for the absent signal.

In accordance with a first exemplary embodiment of the invention which will be described in detail hereinafter, the input means comprises a counter timer receiving clock pulses at a frequency of 1 MHz for example and adapted for each period of an input tacho signal to provide to the control means an evaluation signal corresponding to a count of the number of clock pulses received during the respective tacho period. The control unit comprises a microprocessor to which data is provided representative of the known predetermined period ratio between the input and output signals, such ratio corresponding in a gearbox application for example to the gear ratio that exists between the shaft of the gearbox with which the tachometer is associated and the other shaft under investigation, and as will be described in more detail hereinafter the microprocessor has the task of calculating a data signal to be written into the output signal generation means, such data signal being derived from the evaluation signal received from the counter timer input means in accordance with the predetermined gear ratio data. The output signal generation means comprises an accumulator connected to receive the clock pulses that are counted in the counter timer input means and arranged to have added into it at regular periodic intervals the data signal derived from the microprocessor control unit. When the accumulated value in the accumulator reaches a predetermined point, which in the embodiment in question is the point at which the accumulator fills to capacity, an output pulse signal is generated and the successive generation of such output signals defines the required periodic output signal.

One convenient implementation of the output signal generation means makes use of an adding circuit having a first input from a first register coupled to the output of the microprocessor and a second input from a second register constituting the aforementioned accumulator, the adding circuit having its output coupled to the accumulator. At regular periodic intervals the adding circuit is actuated and its output value is placed in the accumulator, that is to say the second register. When a carry out of the most significant bit of the adding circuit occurs, the output signal is actuated.

An alternative implementation of the output signal generation means makes use of an appropriately programmed microprocessor wherein processor registers or memory locations take the place of the registers abovementioned and the ALU of the processor takes the place of the adding circuit. In this implementation, the carry out of the most significant bit may cause alternative actions to take place, such as operating an analogue-to-digital converter, directly by microprocessor program rather than by the intermediary of an output signal. In the case where a microprocessor is used, the regular periodic intervals required may be generated by an external interrupting signal of known and constant frequency, or by the microprocessor executing a program of instructions whose total execution time is known and constant, such program being predominantly in the form of a loop.

In accordance with another aspect of the present invention there is further provided gearbox vibration monitoring equipment including apparatus as described above, a tachometer associated with one shaft of the gearbox to provide said periodic input signal to said apparatus, vibration sensing means associated with the gearbox for providing a corresponding vibration signal, and analysing means responsive to said vibration signal and to said periodic output signal.

Exemplary embodiments of the present invention will now be described with reference to the accompanying drawings.

DESCRIPTION OF THE EMBODIMENTS

Figure 1:
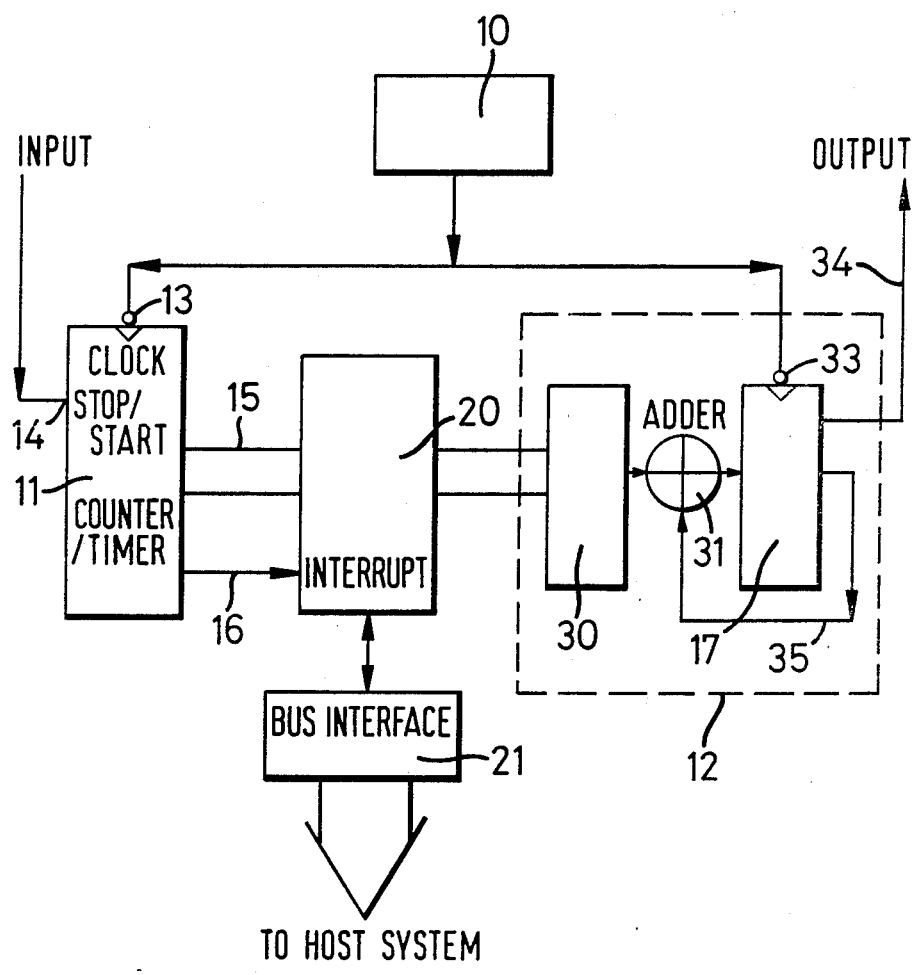
FIG. 1 is a diagrammatic representation of a first form of tacho signal processing apparatus embodying the present invention.

Referring to FIG. 1, the apparatus shown therein comprises a clock 10 providing pulses at a frequency fc of approximately 1 MHz (a period of 1 microsecond) to a counter timer 11 and to an output signal generation unit indicated generally at 12. The output signal generation unit can be considered as a digital oscillator. The counter timer 11 receives clock pulses at an input 13 and signals from a tachometer (not shown) at an input 14.

Figure 2:
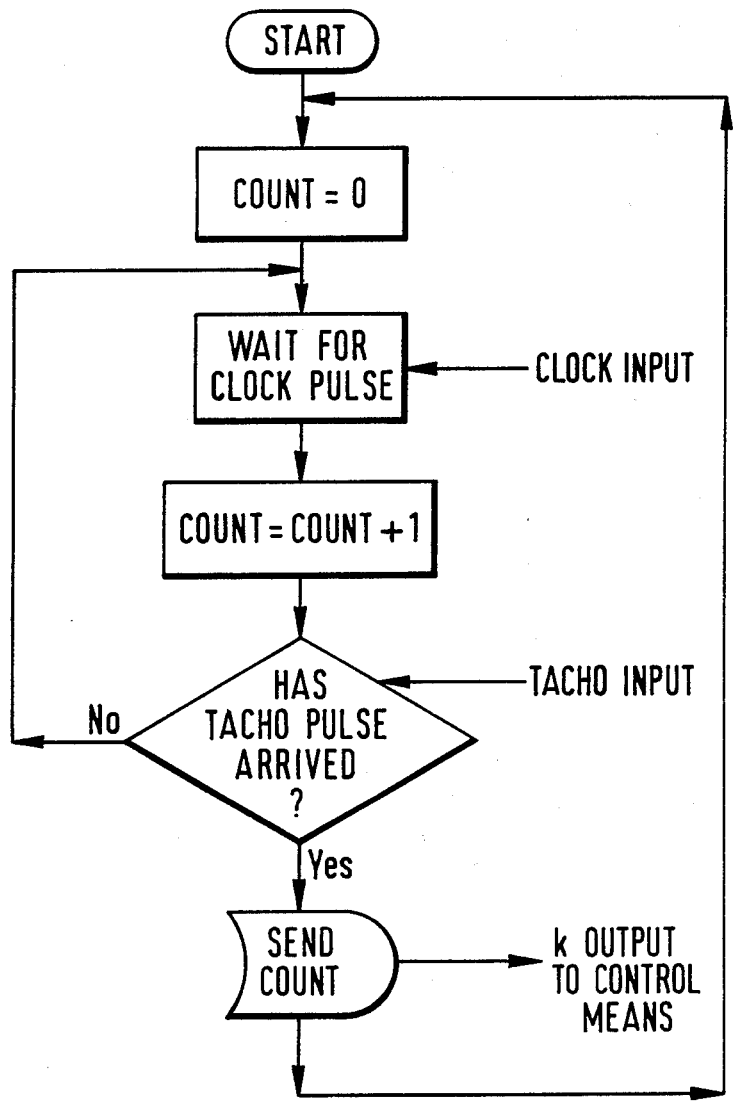
FIG. 2 is a flow diagram illustrating the operation of the counter timer unit of the apparatus shown in FIG. 1.

The tachometer is attached to one shaft of a gear train under investigation and the apparatus illustrated is adapted to generate a periodic output signal having a periodicity and phase relationship to the input signal which corresponds to the rotation of a second specified shaft in the gear train. The counter timer measures the number of clock pulses received in each time period 101, 102, 103 etc. (see FIG. 5) between successive tacho pulses. The counter timer 11 is provided with memory means so that on receipt of a tacho pulse defining the end of a tacho period, it saves the measured number of clock pulses, resets to zero and commences counting the number of clock pulses for the next period. The flow diagram illustrating this action is shown in FIG. 2. The output from the counter timer 11 is passed via a bus 15 to the control unit 20. An interrupt line 16 links the timer counter 11 to the unit 20 to indicate to the unit 20 that a value on bus 15 is to be read.

The control unit 20 comprises a microprocessor having a fast interrupt response for the input line 16 and a 32 arithmetic bit capability which can accept inputs on bus 15. The unit 20 is interconnected via a bus or other interface 21 to a host computer system or other device which provides data to the microprocessor which is representative of the predetermined period ratio between the input signal to counter timer 11 and the required output signal, that is to say, the gear ratio of the shaft being investigated. The control unit calculates a value n to be written in the register 30 in response to new input values k announced by an interrupt on line 16.

The finite time necessary to calculate the new value of n for each tacho period appears as a delay in the system. The delay should be the same for each tacho period, no matter what the actual processing time of the calculation may be. This may be achieved by delaying the update of the register 30 for a fixed period, greater than the maximum interrupt latency plus processing time, after the counter timer has made a new period measurement. A buffer register may be employed to ensure this and also to ensure that no partially modified register value is added to the accumulator.

The output signal generation means 12 comprises a 32 bit register 30, a 32 bit adder 31, and a 32 bit register accumulator 17. The accumulator 17 receives the clock pulses from clock 10 at a clock input 33 and has a first output bus 35 looped back to adder 31. The periodic output signal is provided on a second output line 34. Once per clock cycle, that is to say at an interval $T_c$, the value n in the register 30 is added via adder 31 to the contents of the accumulator 17 on bus 35 and the sum is entered into the accumulator. The output on line 34 is taken from the most significant bit of the accumulator 17. The accumulator has a maximum count of $2^{32}-1$ so that an accumulation of $2^{32}$ counts corresponds to one period (360°) of the output signal on line 34. The value added into the accumulator 17 at each clock pulse determines the rate at which the accumulator fills and thus determines the period of the output on line 34.

Figure 3:
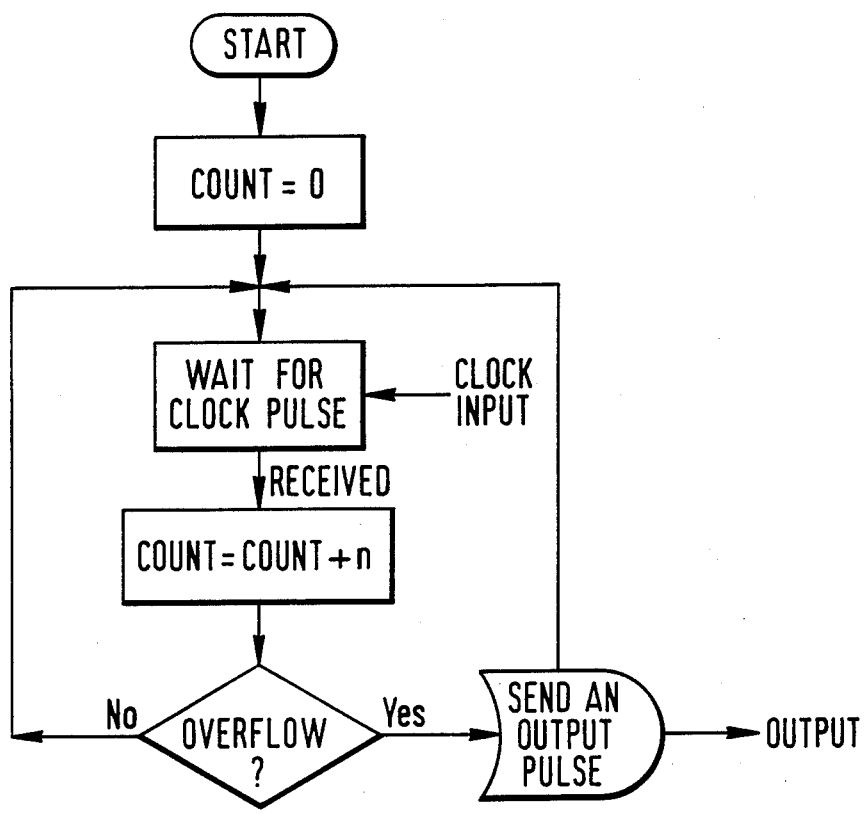
FIG. 3 shows a flow diagram illustrating the operation of the output signal generation means of the apparatus shown in FIG. 1.
Figure 4:
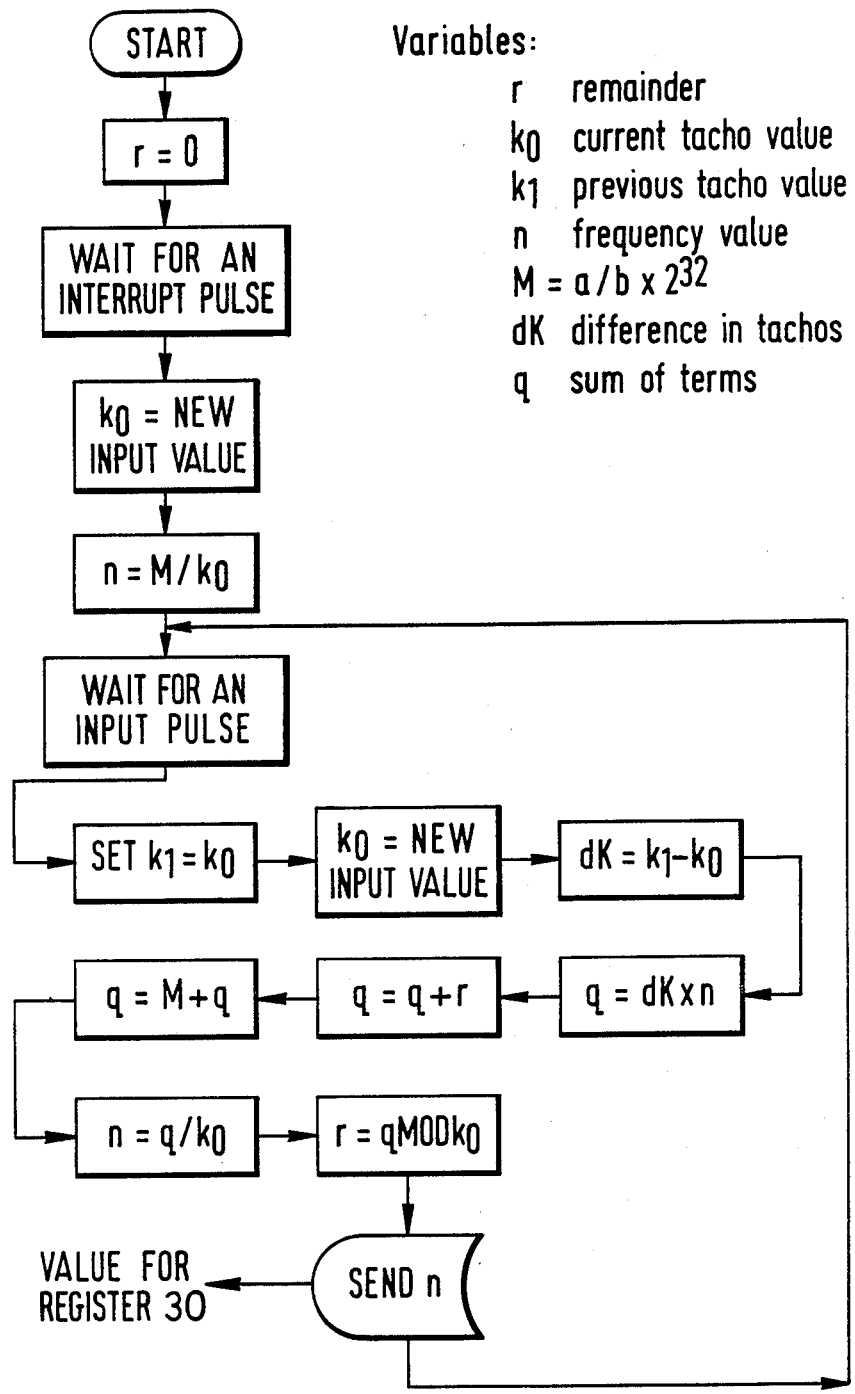
FIG. 4 shows a flow diagram illustrating the operation of the control unit of the apparatus shown in FIG. 1.

In operation of the apparatus of FIG. 1, tacho input signals are received by the counter timer unit 11 and at the end of each tacho signal period, the control unit 20 calculates a count value n to be added into register 30, the count value being calculated, for example, according to the flow diagram shown in FIG. 4. FIG. 3 illustrates how the current count value stored in register 30 is added to the accumulator 17 on receipt of each clock pulse. When the accumulator 17 overflows, an output signal is produced on the output 34. The theory behind the calculation of the count value n and the flow diagram shown in FIG. 4 is explained below.

The simplest case will be taken first, with it being assumed that the period of the input signal from the tachometer is constant and rounding errors being neglected. The frequency of the signal output on line 34 is required to be a/b times the tacho input signal frequency, where a/b is the gear ratio of the shaft under investigation.

In each tacho period k clock pulses are counted, since the input frequency is assumed constant, and the received input tacho frequency is given by the expression:

$$f\text{tacho} = \frac{fc}{k} \qquad \text{A}$$

where $fc$ is the frequency of the signal from the clock 10.

The desired output frequency is $f$tacho multiplied by a/b and therefore is given by the formula:

$$\begin{aligned} f\text{out} &= a/b \cdot f\text{tacho} \\ &= a/b \cdot \frac{fc}{k} \end{aligned} \qquad \text{B}$$

Since the accumulator 17 has a maximum count of $2^{32}-1$ and an accumulation of $2^{32}$ counts correspond to one cycle (360°) of the desired periodic output signal, therefore the output frequency will be given by the expression:

$$f\text{out} = 2^{-32} n\, fc. \qquad (C)$$

in the case where for each clock pulse the accumulator 17 is incremented by an amount n.

Equations B and C can now be solved for n in terms of a, b, and k to derive the expression:

$$n = \frac{2^{32} a}{bk} \qquad \text{E}$$

This is precisely what would be expected since one tacho input period corresponds to k clock pulses. At each clock pulse n is added to the contents of the accumulator 17, thus in one tacho input signal period of k clock pulses $$nk = \frac{2^{32} ak}{bk} = \frac{2^{32} a}{b} \qquad \text{F}$$

is added to the accumulator. Since an output signal on line 34 is generated each time the accumulator 17 counts up to $2^{32}$, therefore it follows from equation F that there are a/b periods of output signal on line 34 for each tacho input period, as is required. Thus, for the case of a tacho input signal of constant period, the required periodic output signal is obtained.

Figure 5:
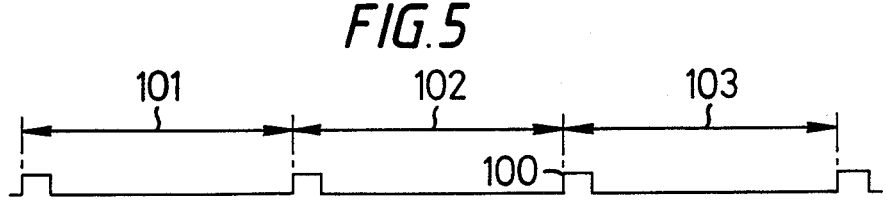
FIG. 5 illustrates the periodic nature of the tacho input pulses received by the apparatus shown in FIG. 1.

In the foregoing, consideration has only been given to the case of a constant tachometer input signal and it will be appreciated that for the case of a varying tacho input signal, it is important particularly for preferred applications of the apparatus to gearboxes, that the apparatus should provide a periodic output signal having a predetermined frequency and phase relationship with the tacho input signal. If the tacho input signal frequency is varying, successive tacho periods will not give rise to the same value of k as defined above and the value of k used in calculating the value n to be added to the accumulator will not correspond to the immediately prevailing situation. This requires a phase correction term to be included in the calculation of n. Using the notation $k_{i-1}$, $k_i$ to denote the values of k for the $(i-1)^{th}$ tacho period 101 and the $i^{th}$ tacho period 102 respectively (see FIG. 5), the difference in the number of clock pulses between the tacho signal periods 102 and 101 can be expressed as $$dk_i = k_{i-1} - k_i \qquad \text{G}$$

and, at the start of the next tacho period 103, multiplying $dk_i$ by $n_{i-1}$ (namely the value of n added to the accumulator 17 for each clock pulse during the $(i-1)^{th}$ tacho period 101) gives the difference between the value actually in the accumulator at the end 100 of the tacho period 102 and the value that would have been in there had there been no change in the frequency of the tacho input signal. The difference corresponds to the phase error mentioned above. Referring to FIG. 5, at the end 100 of the current tacho period 102, a new value of n is determined, which must correct this error during the succeeding tacho period 103 on the assumed basis that the succeeding tacho period 103 will be the same length as the current tacho period 102. The error accumulated during the $i^{th}$ tacho period should most conveniently be corrected by adjusting the value of n for the $(i+1)^{th}$ tacho period so that by the end of the $(i+i)^{th}$ period the error has been reduced to zero. It is assumed for this purpose that the $(i+1)^{th}$ period is the same length as the $i^{th}$ period hence the error must be corrected in no more time than $k_i$ clock cycles.

In order to make correction for this phase error, the value of n is calculated as the sum of two terms. The first term, which generates the required frequency, is the accumulator overflow value at which an output pulse is generated ($2^{32}$ in this case) multiplied by the required frequency ratio a/b and divided by the number k of clock cycles in the current $(i^{th})$ input period.

The second, phase correlation term, is the difference dk, between the numbers of clock cycles in the previous $(i-1)^{th}$ and current $i^{th}$ input periods, multiplied by the value of $n_{i-1}$ calculated at the end of the previous input period, and divided by the number k of clock cycles in the current $(i^{th})$ input period. It represents the total phase error to be corrected, divided by the estimated time available for the correction to be made. It has dimensions (phase)/(time), and hence may be added to the frequency term.

Expressed algebraically, the calculation of n must be in accordance with the equation:

$$n_i = \frac{2^{32}a}{k_i b} + \frac{dK_i n_{i-1}}{k_i} \qquad \text{H}$$

If the next $(i+1)^{th}$ tacho period 103 proves to be exactly $k_i$ clock pulses long, the error will have been exactly compensated for by the end of the period. If not, there will be another (different) error $(k_i - k_{i-1})n_i$ at the end of the $(i+1)^{th}$ cycle, and this must be compensated for during the succeeding $(i+2)^{th}$ tacho period in the same way.

The operation of the circuit of FIG. 1 requires that n and k are integers. In equation H, assuming that $2^{32}a/b$ is an integer, the division by $k_i$ can give rise to a non-integral result and this must be truncated to give an integral value of $n_i$. This introduces an additional source of error which it is possible to compensate for at the end of each tacho period.

The division by $k_i$ will in general leave a remainder $r_i$, which represents that portion of the phase error which occurred during the $i^{th}$ tacho cycle which will remain uncorrected during the following $(i+1)^{th}$ tacho cycle. The remainder $r_i$ can thus be added into the error correction term for the following $(i+1)^{th}$ tacho period.

Thus equation H for the $i^{th}$ tacho period may be modified by the inclusion of $r_{i-1}$ and the value $n_i$ thus becomes the integral part of the expression:

$$\frac{\left[ \frac{2^{32}a}{b} + dK_i n_{i-1} + r_{i-1} \right]}{k_i} \qquad \text{I}$$

Similarly $r_i$ is given by the remainder after the division by $k_i$ so that $$r_i = \left[ \frac{2^{32}a}{b} + dK_i n_{i-1} + r_{i-1} \right] \text{MOD}(k_i) \qquad \text{J}$$

By use of the expression I for $n_i$ an output signal can be generated at a frequency which is adjusted so as to minimize the phase error produced by changes in input frequency. In the steady state the phase error is reduced to zero.

The finite time necessary to calculate the new value of n for each tacho period appears as a delay in the system. The delay should be the same for each tacho period, no matter what the actual processing time of the calculation may be.

Figure 6:
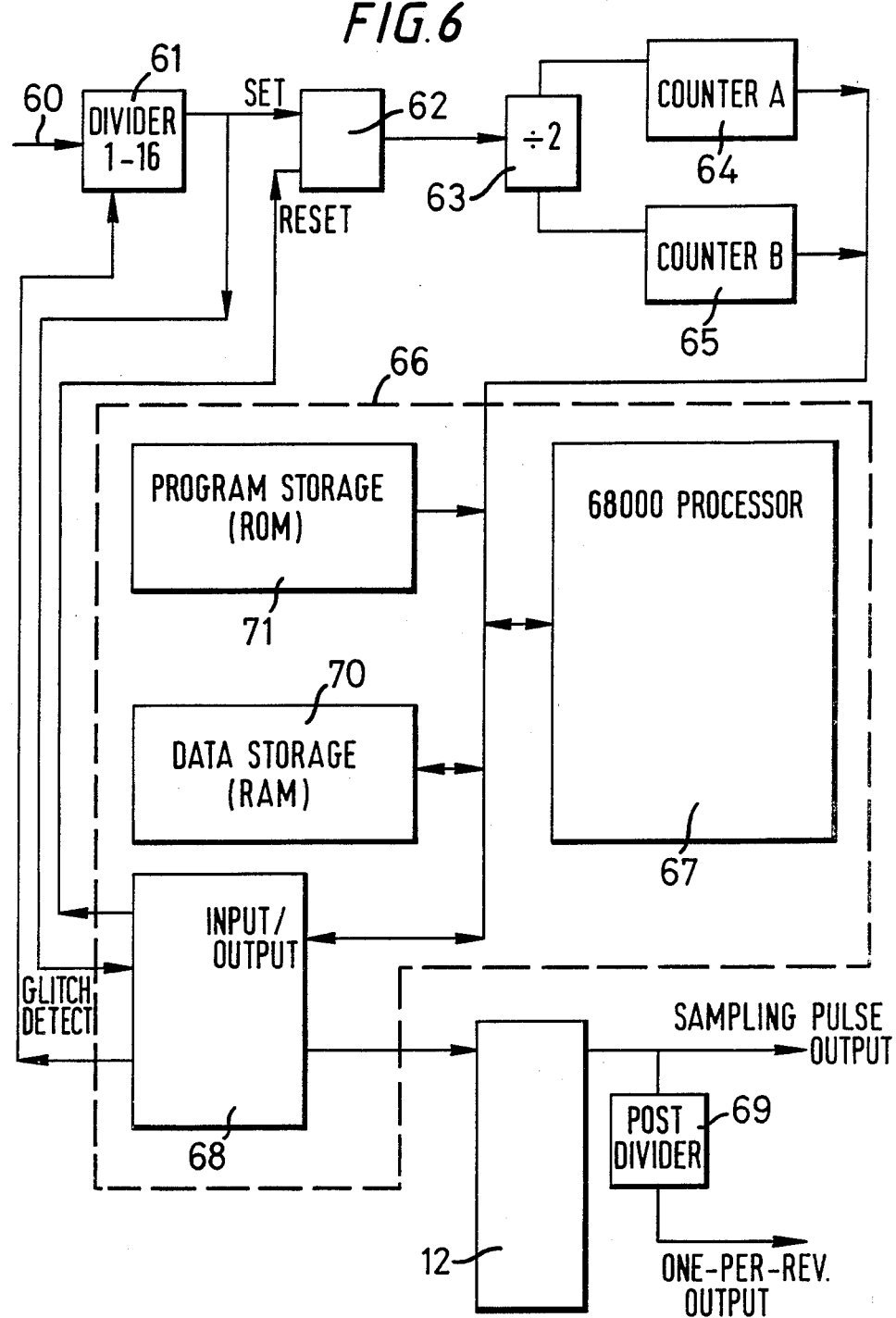
FIG. 6 illustrates a second form of tacho signal processing apparatus embodying the present invention.

FIG. 6 illustrates a block diagram of a system embodying the present invention. The input tacho signal appears on line 60 which is fed into a variable modulus pre-scaler 61 to allow a greater range of input signal frequencies to be handled by the apparatus. The signals therefrom pass to a set/reset latch 62 which permits the pulse to be transmitted to the next stage only following a selectable fraction of the input period. This implements the spurious pulse rejection described above. The processor 66 controls the fraction of the input period during which pulses will be ignored by resetting the latch. The signal from the latch 62 is used to toggle a divide by 2 flip-flop 63 providing inputs to two counters 64 and 65 with a common input clock. The values in these two counters can then be read by a microprocessor 67 of the control unit 66. Two counters are employed so that one is timing the interpulse duration whilst the other is available to be read by the microprocessor and reset to zero. The algorithm I above is implemented by the microprocessor.

Improvements may be added to the processor algorithm to deal with glitch rejection. The principle is to limit the effect of spurious input pulses by making the assumption that the rate of change of the input signal frequency is limited. The maximum rate of change can be specified by the user, typically being set at 5% change per input cycle. Thus, the input latch 62 is only reset to receive a pulse after 95% of the time period of the previous pulse has elapsed. Should a pulse occur before this, it is treated as a glitch and ignored. Nonetheless, in order that step changes in the input signal frequency produced, for example, by switching from one shaft tacho to another can be accommodated, a glitch occurring twice causes latch 62 to be reset immediately after detection of a subsequent tacho pulse. Missing pulse detection may also be performed by checking the tacho input period to see if it corresponds to roughly twice the previous tacho input period. If it does, the count value k for the respective period is halved and processing continues.

Tacho period measurement is provided by the counters with 1 microsecond resolution and a maximum count of 16 million, thus theoretically input frequencies down to 0.06 Hz can be handled. In practice, because of the need to identify a 'no signal present' condition, the minimum input frequency is set as 0.25 Hz. The upper frequency limit is primarily determined by the execution speed of the algorithm since the new count value n must be calculated before the next input transition. Since the execution time is not constant, the external hardware performs the output updating at a suitable time after the output frequency value n has been placed in the buffer. By choosing this to be 250 $\mu$S it allows a theoretical maximum input frequency of 4 kHz: this provides a comfortable margin if further software modifications are required.

Preferably at least 23 bit control over the output frequency is provided which gives increments of frequency so that sufficiently fine control is available when higher frequencies are being generated. The output signal generation unit 12 may provide the sampling output and if a once-per-rev output is desired at the output frequency, this can be provided via a programmable divider 69.

The heart of the control unit 66 is a Motorola 68000 microprocessor, which runs at a clock speed of 10 MHz. It is provided with 16 Kbytes of RAM 70, and 16 Kbytes of ROM 71, in addition to two 68230 chips, which provide counters 64 and 65. The output signal generator 12 is implemented using eight SN74LS681 accumulator/adder register chips.

Figure 7:
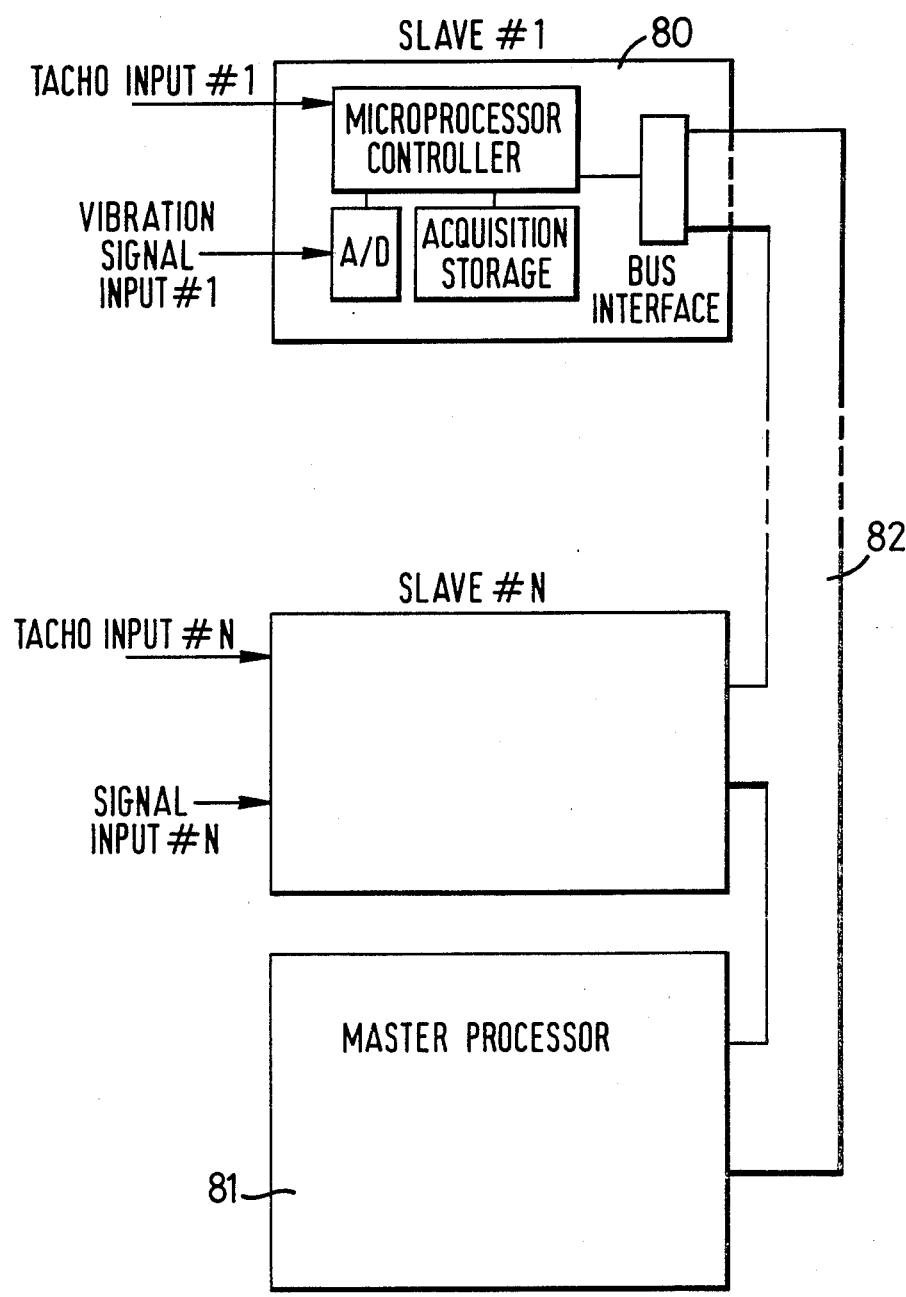
FIG. 7 illustrates a third form of apparatus embodying the present invention and adapted for producing a plurality of output signals each having a predetermined frequency and phase relationship to a respective periodic input signal.

FIG. 7 illustrates an arrangement embodying the present invention wherein respective tacho input signals are presented to a plurality of slave units 80 together with, in each case, a vibration signal which is to be analysed. The slave unit operates in the manner described above to implement both the input counter/timer means and the output signal generation means. At every occurrence of a tacho pulse, each slave unit makes available to the master processor 81 the time interval measured for the previous tacho input signal period. The master processor calculates the required count increment value n for each slave unit according to a stored algorithm. The respective n values are then fed back to the slave units which use them directly to control the rate of sampling of the respective vibration signal input for its onboard analogue-to-digital converter. This can be carried out in parallel with synchronous averaging of the measured samples. The communication between slave and master takes place over a bus 82 which allows the number of slave units to be expanded to the required number of channels. The number of slave units that can be controlled by one master depends on the master processor's calculation speed and also the rate of tacho pulse input. In one example. 16 slaves can be accommodated at tacho frequencies up to 1000 Hz.

In another embodiment of the invention, a single master processor accessing multiple values of a/b can evaluate a number of parallel outputs from the same tacho input. In this way, a single control unit can provide multiple signal analyses based on a single tacho input signal.

The response of the output signal lags at the most just over one tachometer period behind the true shaft behaviour, which is the best that can be achieved by any sampled data system and is considerably better than any current analogue or digital phase locked loop frequency multiplier system.

What we claim is:

1. An apparatus for producing a periodic output signal having predetermined frequency and phase relationship to a variable frequency periodic input signal, said apparatus comprising:

input means for evaluating successive periods of said periodic input signal as multiples of a clock signal period and outputting a succession of first data signals, each representative of the duration of a corresponding period of the periodic input signal;

control means coupled to said input means for receiving said first data signals from the input means, said control means operating upon each said first data signal in accordance with a predetermined algorithm so as to derive a succession of second data signals each representative of a quantity having a relationship to a respective one of said first data signals which is determined by said algorithm, wherein said algorithm executed by said control means includes a first component which is a function of said predetermined frequency relationship and a second component which is a function of the changing periodicity of said periodic input signal and effects a correction of the phase of the signal to account for a finite delay inherent in the operation of said control means to derive said second data signals; and output signal generation means coupled to said control means for receiving said second data signals from the control means and including accumulator means incremented at a rate equal to the clock frequency and by quantities corresponding to the received second data signals, said output signal generation means producing an output signal whenever the accumulated amount attains a predetermined level.

2. An apparatus as claimed in claim 1 wherein said output signal generation means comprises a first register having an input and an output; said input coupled to said control means for receiving said second data signals one at a time therefrom, said accumulator means comprising a second register having an input and an output, and an adding circuit having a first input connected to the output of said first register and a second input connected to the output of said second register and having an output connected to the input of said second register, the adding circuit repetitively incrementing the second register by the quantity entered in the first register at said clock frequency, and the output signal generation means providing said output signal each time the second register fills to capacity.

3. An apparatus as claimed in claim 2 wherein said first and second registers and said adding circuit are respective parts of a microprocessor.

4. An apparatus as claimed in claim 1 and including a plurality of said output signal generation means operatively associated with a single said control means, said control means deriving for each of said output signal generation means respective said second data signals derived in accordance with a respective algorithm.

5. An apparatus as claimed in claim 1 wherein said input means evaluates the successive periods of said periodic input signal as integral multiples of said clock signal period and said control means derives second data signals representative of integral quantities, and wherein the algorithm executed by said control means includes a third component which effects a correction of the phase of the output signal to take account of truncation to an integral quantity of the result obtained by execution of the algorithm.

6. An apparatus as claimed in claim 5 wherein said control means evaluates the expression $$\frac{C\,a/b + dk_i n_{i-1} + r_{i-1}}{k_i}$$

for each period or said periodic input signal and to provide the integral part of the result of such evaluation to said output signal generation means, wherein:

C = said predetermined level accumulated in said accumulator;
a/b = said predetermined frequency relationship;
$k_i$ = the multiple of the clock signal period output by the input means for the $i^{th}$ period of the periodic input signal;
$dk_i = k_{i-1} - k_i$;
$n_{i-1}$ = the integral part of the evaluation of the said expression for the $(i-1)^{th}$ period of the periodic input signal; and
$r_{i-1}$ = the remainder after the integral part of the evaluation of said expression for the $(i-1)^{th}$ period of the periodic input signal.

7. An apparatus as claimed in claim 1 wherein said periodic input signal comprises a tacho signal indicative of the rotation of a first rotating body and said predetermined frequency relationship corresponds to the relationship between said first rotating body and a second rotating body coupled thereto with a predetermined gearing ratio, and wherein said apparatus further comprises means for developing a signal representative of vibrations of said rotating bodies and means for analyzing said vibration signal at the frequency of said periodic output signal for determining the condition of said second rotating body.

8. An apparatus for producing a periodic output signal having a predetermined frequency relationship and a fixed phase relationship with a periodic input signal, said apparatus comprising:

input means having a first input for receiving said periodic input signal, a second input for receiving a constant frequency clock signal, and an output, said input means provides at said output a count signal $k_i$ indicative of the integral number of clock signals occurring in the $i^{th}$ period of the input signal;

control means having a first input connected to the output of said input means for receiving therefrom said count signal $k_i$, a second input for receiving a control signal a/b representative of said predetermined frequency relationship, and a control means output, said control means provides at said control means output a signal representative of an integral quantity $n_i$ derived by operation upon the count signal $k_i$ in accordance with a predetermined algorithm; and output signal generation means having a first input connected to said control means for receiving therefrom said signal representative of the integral quantity $n_i$, a second input for receiving a constant frequency clock signal, and an output, said output signal generation means repetitively increments an accumulated count by said integral quantity $n_i$ at the frequency of said clock signal receives at said second input thereof and to provide a signal at said output of the output signal generation means whenever the accumulated count attains predetermined equally spaced-apart levels;

said control means derives said signal representative of $n_i$ by evaluation of the expression $$\frac{C\,a/b + dk_i n_{i-1} + r_{i-1}}{k_i}$$

for each period of the periodic input signal and by provision of the integral part of the result of such evaluation as $n_i$, and wherein:

C = the spacing apart of the predetermined accumulated count levels;
$dk_i = k_{i-1} - k_i$;
$n_{i-1}$ = the integral part of the evaluation of said expression for the $(i-1)^{th}$ period of the periodic input signal; and
$r_{i-1}$ = the remainder after the integral part of the evaluation of said expression for the $(i-1)^{th}$ period of the periodic input signal.

9. An apparatus as claimed in claim 8 wherein said output signal generation means includes an accumulator having a maximum count capacity of (C-1), and an output is provided from said output signal generation means whenever said accumulator fills to capacity.

10. An apparatus as claimed in claim 9 wherein said output signal generation means comprises a first register coupled to said control means for receiving said signals representative of $n_i$ therefrom, a second register constituting said accumulator, and adding means coupled with said first and second registers for repetitively incrementing the count in the second register by the quantity in the first register at the frequency of said clock signal.

11. An apparatus as claimed in claim 8 and including a plurality of said output signal generation means operatively associated with a single said control means, said control means derives for each of said output signal generation means respective $n_i$ signals derived in accordance with respective a/b control signals.

12. An apparatus as claimed in claim 11 wherein said periodic input signal comprises a tacho signal indicative of the rotation of a first rotating body and said predetermined frequency relationship for each of said plurality of output signal generation means corresponds to the relationship between said first rotating body and a respective one of a plurality of second rotating bodies, and wherein said apparatus further comprises means for developing signals representative of the vibrations of said rotating bodies and means for analyzing said vibration signal at the respective frequencies of the periodic output signals of said plurality of output signal generation means.

13. An apparatus as claimed in claim 12 wherein said first and second rotating bodies comprise components in a gearbox.

14. An apparatus as claimed in claim 8 wherein said periodic input signal comprises a tacho signal indicative of the rotation of a first rotating body and said predetermined frequency relationship corresponds to the relationship between said first rotating body and a second rotating body coupled thereto with a predetermined gearing ratio, and wherein said apparatus further comprises means for developing a signal representative of vibrations of said rotating bodies and means for analyzing said vibration signal at the frequency of said periodic output signal for determining the condition of said second rotating body.

15. An apparatus as claimed in claim 14 wherein said first and second rotating bodies comprise components in a gearbox.

16. An apparatus for analyzing vibrations in a machine having a plurality of interconnected parts rotating at different speeds, said apparatus comprising:
   a vibration transducer mounted on said machine outputting a vibration signal representative of the machine vibrations, said vibration signal including components originating in the different rotating parts of the machine;
   a tachometer coupled to one of the rotating parts of the machine for delivering a periodic output signal indicative of the rotation thereof;
   a counter timer connected to receive said tachometer output signal at a first input thereof and to receive a constant frequency clock signal at a second input thereof, said counter timer outputs a count value k representative of the number of clock signals received in each period of the tachometer output signal;
   a control unit coupled to said counter timer to receive therefrom said count value n for each period of the tachometer output signal, said control unit to compute a value n according to a predetermined algorithm, said algorithm being a function of said count value k and of a predetermined frequency relationship known to exist between the rotation of said one of the rotating parts of the machine and the rotation of a second part which is required to be investigated;
   output signal generation means for generating a periodic output signal having a frequency relationship with said tachometer output signal corresponding to the frequency relationship known to exist between said one of the rotating parts of the machine and said second rotating part, said output signal generation means comprising an accumulator, means for repetitively incrementing the count accumulated in said accumulator by said value n computed by the control unit at the frequency of a clock signal, and means for outputting a signal whenever the count accumulated in the accumulator reaches predetermined equally spaced-apart levels, said output signal constituting the periodic output signal of the output signal generation means; and means for analyzing components of said vibration signal at the frequency of said periodic output signal from said output signal generation means.

17. An apparatus as claimed in claim 16 further comprising a plurality of said output signal generation means operatively associated with a single said control unit, said control unit derives respective values n for each of said output signal generation means.

18. An apparatus as claimed in claim 17 comprising a plurality of slave units comprising a respective said counter timer and a respective said output signal generation means, and said master unit comprising said single said control unit.

19. An apparatus as claimed in claim 16 wherein said output signal generation means comprises a first register having an input coupled to said control means for receiving said second data signals one at a time therefrom and an output, a second register constituting said accumulator means and having a input and an output, and an adding circuit having a first input connected to the output of said first register and a second input connected to the output of said second register and having an output connected to the input of said second register, the adding circuit repetitively increments the second register by the quantity entered in the first register at said clock frequency, and the output signal generation means provides said output signal each time the second register fills to capacity.

20. An apparatus as claimed in claim 16 wherein said control unit evaluates the expression $$\frac{C\,a/b + dk_i n_{i-1} + r_{i-1}}{k_i}$$

for each period of said periodic input signal and to provide the integral part of the result of such evaluation to said output signal generation means, and wherein:
   C = said predetermined level accumulated in said accumulator;
   a/b = said predetermined frequency relationship;
   $k_i$ = the multiple of the clock signal period output by the input means for the $i^{th}$ period of the periodic input signal;
   $dk_i = k_{i-1} - k_i$;
   $n_{i-1}$ = the integral part of the evaluation of the said expression for the $(i-1)^{th}$ period of the periodic input signal;
   $r_{i-1}$ = the remainder after the integral part of the evaluation of said expression for the $(i-1)^{th}$ period of the periodic input signal.

* * * * *